United States Patent
Chang et al.

(10) Patent No.: US 11,378,767 B2
(45) Date of Patent: Jul. 5, 2022

(54) LENS ADJUSTING MECHANISM

(71) Applicant: Young Optics Inc., Hsinchu (TW)

(72) Inventors: Yu-Chen Chang, Hsinchu (TW); Chia-Chang Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 17/109,202

(22) Filed: Dec. 2, 2020

(65) Prior Publication Data

US 2021/0080679 A1 Mar. 18, 2021

Related U.S. Application Data

(63) Continuation of application No. 15/662,370, filed on Jul. 28, 2017, now abandoned.

(51) Int. Cl.
*G02B 7/02* (2021.01)
*G03B 21/14* (2006.01)
*G02B 13/16* (2006.01)

(52) U.S. Cl.
CPC ............ *G02B 7/023* (2013.01); *G02B 7/026* (2013.01); *G03B 21/142* (2013.01); *G02B 13/16* (2013.01)

(58) Field of Classification Search
CPC ........ G02B 7/023; G02B 7/026; G02B 13/16; G03B 21/142
See application file for complete search history.

(56) References Cited

U.S. PATENT DOCUMENTS

| | | | |
|---|---|---|---|
| RE42,740 E | 9/2011 | Fujimori et al. | |
| 9,482,934 B2 | 11/2016 | Nemura et al. | |
| 2008/0266682 A1* | 10/2008 | Ishizawa | G02B 7/08 359/824 |
| 2012/0236423 A1* | 9/2012 | Uno | G03B 3/00 359/814 |
| 2013/0120720 A1* | 5/2013 | Hellin | G03B 5/06 353/101 |
| 2014/0092371 A1* | 4/2014 | Nemura | G03B 21/142 353/101 |
| 2014/0111877 A1* | 4/2014 | Uno | H02N 2/026 359/814 |

FOREIGN PATENT DOCUMENTS

| | | |
|---|---|---|
| CN | 105356714 A | 2/2016 |
| TW | I325090 B | 5/2010 |

* cited by examiner

*Primary Examiner* — William R Alexander
*Assistant Examiner* — Sharrief I Broome

(57) ABSTRACT

A lens adjusting mechanism includes a light-valve case, a lens case, one fastener, and a leaf spring assembly. The light-valve case has an emitting opening and a first opening edge, disposed on the peripheral portion of the emitting opening. The lens case has a light-path entrance and a light-path exit. The lens case also has a second opening edge. The second opening edge is disposed on the peripheral portion of the light-path entrance. The fastener is connected between the first opening edge and the second opening edge. The leaf spring assembly has at least one leaf contact. The leaf spring assembly is disposed between the first opening edge and the second opening edge. The leaf contact contacts the first opening edge or the second opening edge. The fastener is used to adjust the distance between the first opening edge and the second opening edge.

20 Claims, 7 Drawing Sheets

LENS ADJUSTING MECHANISM

This application is a continuation application of U.S. application Ser. No. 15/662,370, filed Jul. 28, 2017, the contents of which are incorporated herein by reference.

BACKGROUND OF THE INVENTION

Field of the Invention

The present invention relates to a lens adjusting mechanism, especially a projecting lens adjusting mechanism.

Description of the Related Art

A lens module is usually a set of lenses consisting of one or more optical glass lenses, including concave lens, convex lens and combinations thereof. A lens module can be used in a camera, video camera, microscope, telescope, projector, and/or other 3C products.

The lens module is a tool for transferring the image light and imaging the image. In the field of optics, the lens module has an optical axis, and under an ideal condition, image beam is corresponding and matched with the optical axis after assembled.

However, when a lens module is assembled to a device, image beam is usually unable to be matched with the optical axis due to tolerant specifications of production and assembling of different elements. Using a projector as an example, the tolerances can result in disproportional distortion of image on a screen, and therefore result in resolution and quality decreases.

Thus, there is a need of a lens adjusting mechanism to solve the above defects.

SUMMARY OF THE INVENTION

An embodiment of the present invention provides a lens adjusting mechanism, which includes a light-valve case, a lens case, at least one fastener and a leaf spring assembly. The light-valve has a light emitting opening and a first opening edge, wherein the first opening edge adjacent to the light emitting opening. The lens case has a light-path entrance, a light-path exit and a second opening edge, wherein the second opening edge adjacent to the light-path entrance. At least one fastener is to connect the first opening edge and the second opening edge. And the leaf spring assembly has at least one leaf contact disposed between the first opening edge and the second opening edge and abutting against the first opening edge or the second opening edge. Wherein the at least one fastener can adjust a distance between the first opening edge and the second opening edge.

An embodiment of the present invention provides a lens adjusting mechanism, which includes a lens carrier, a thin elastic element and at least one combiner. The lens carrier has a first light-path through hole, a second light-path through hole and a through-hole edge, wherein the through-hole edge adjacent to the first light-path through hole. The thin elastic element has at least an elastic hook, attached to the through-hole edge. The at least one combiner is to combine the through-hole edge and the thin elastic element, wherein the at least one combiner can adjust a distance between the thin elastic element and the through-hole edge.

Therefore, embodiments of the present invention provides a lens adjusting mechanism, which can compensate manufacturing tolerances of parts and assembling tolerances during the assembling process and make the image beam matched with the optical axis or being parallel to the optical axis of light valve by the design of the leaf spring assembly, the thin elastic element, the plate spring or the elastic element. And thus, quality of an image on the screen can be improved.

The present invention will become more readily apparent to those ordinarily skilled in the art after reviewing the following detailed description and accompanying drawings.

DETAILED DESCRIPTION OF THE INVENTION

Figure 1:
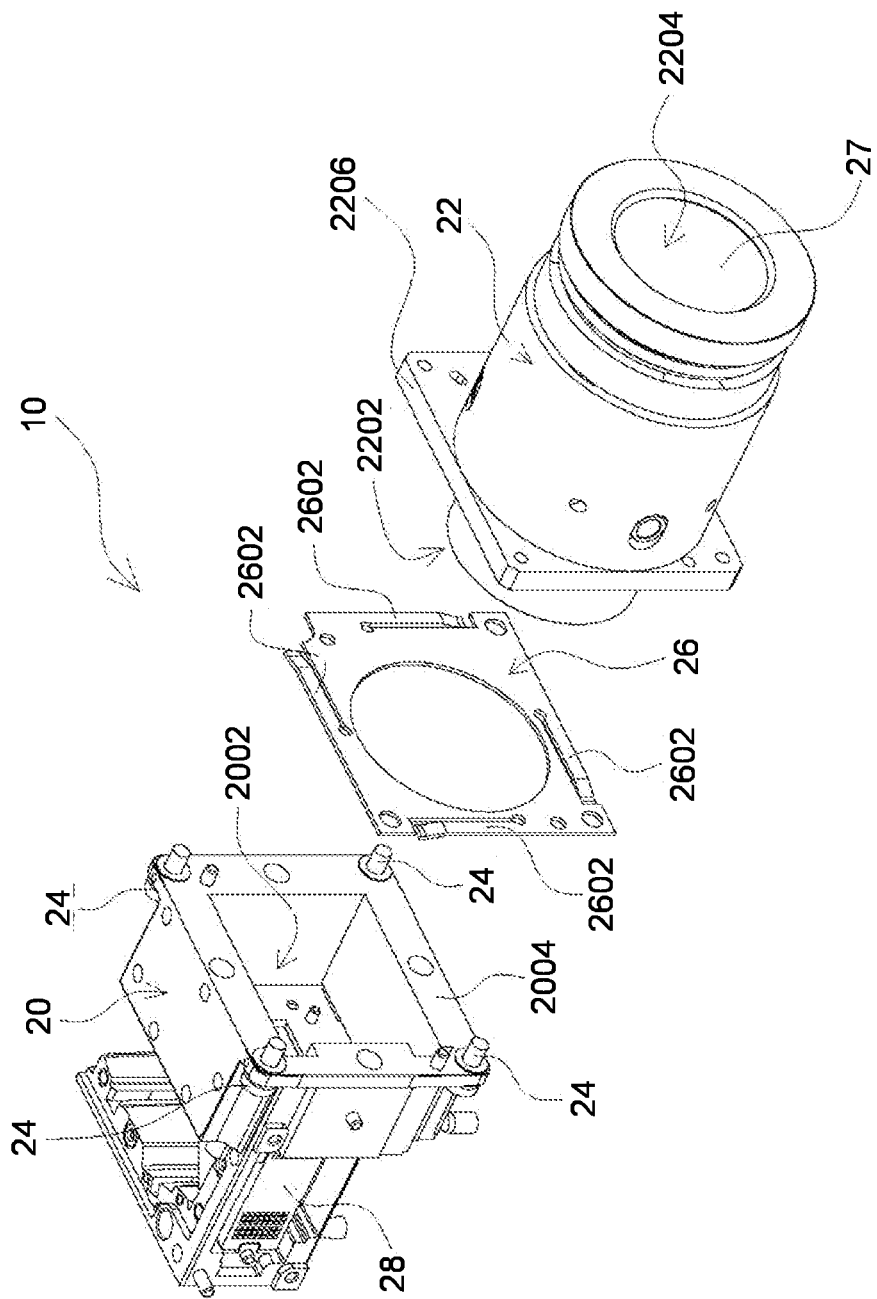
FIG. 1 is an explosion drawing of a lens adjusting mechanism according to an embodiment of the present invention.
Figure 2:
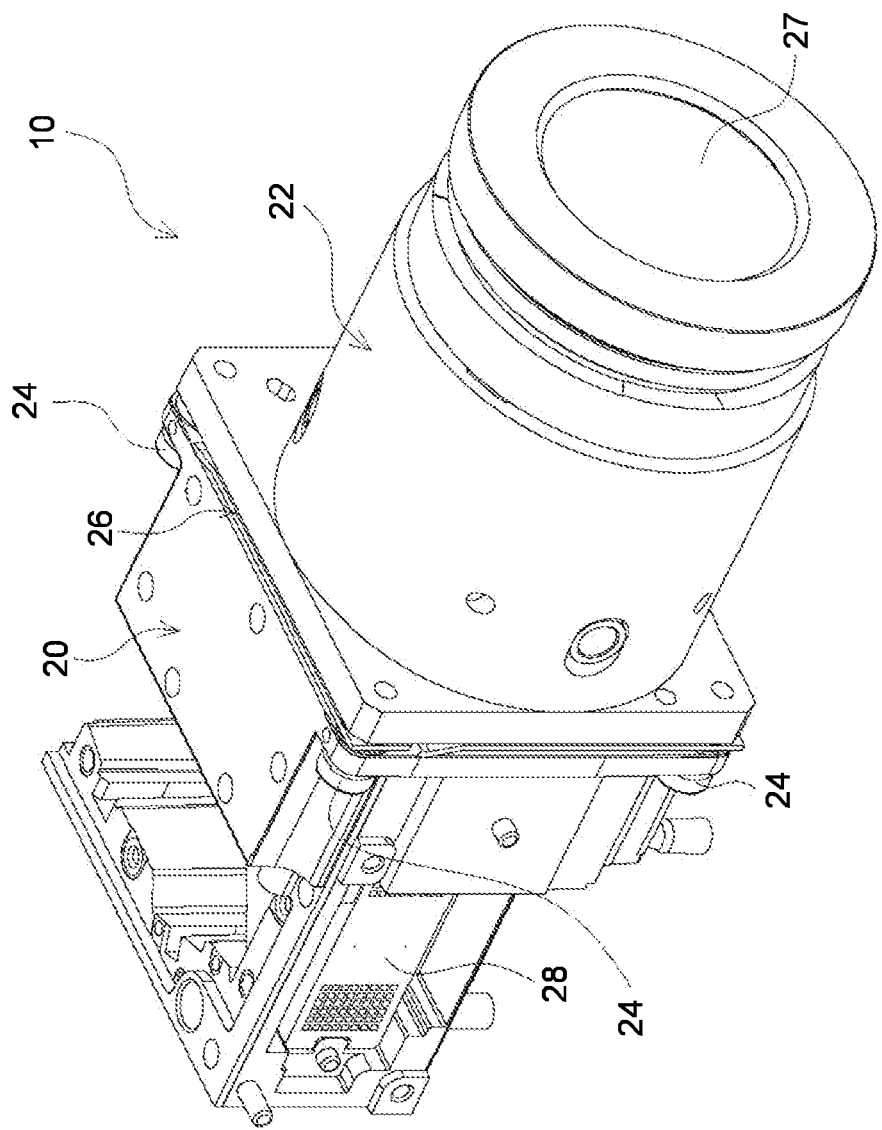
FIG. 2 is an assembly drawing of the lens adjusting mechanism as shown in FIG. 1.
Figure 3:
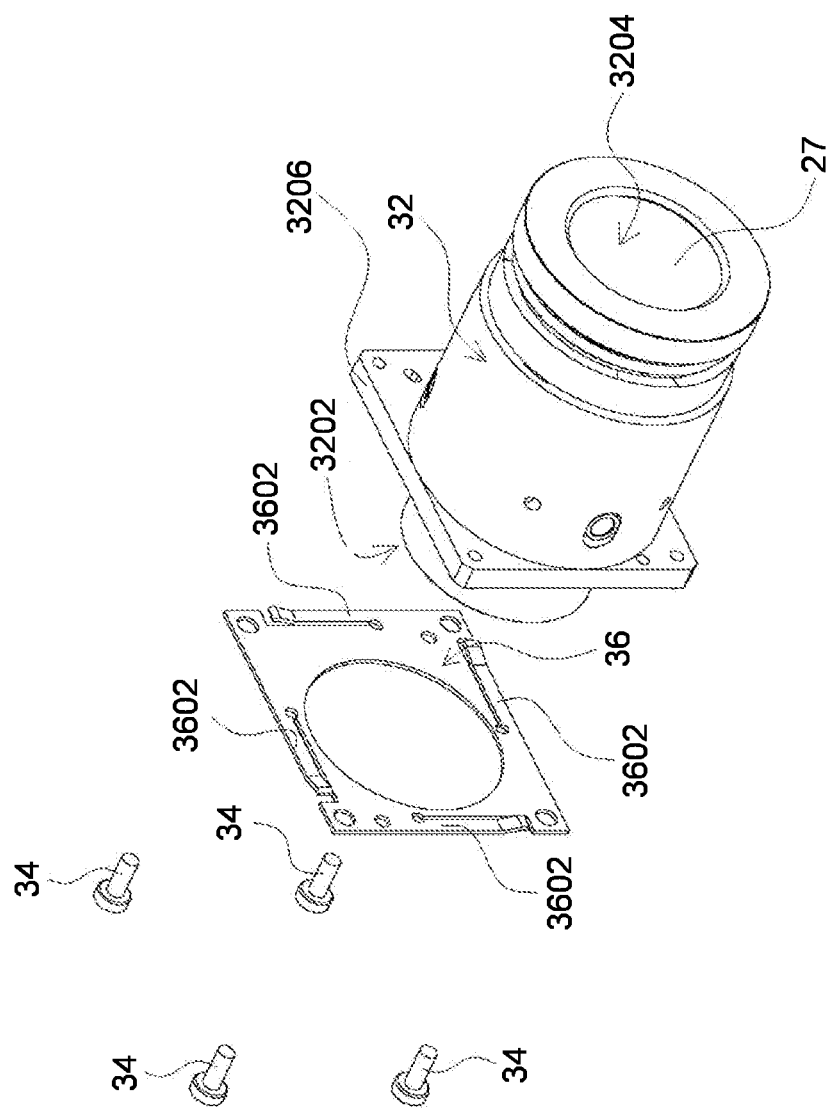
FIG. 3 is an explosion drawing of a lens adjusting mechanism according to another embodiment of the present invention.

The embodiments of the present invention are related to a lens adjusting mechanism. Please refer to FIG. 1, FIG. 2 and FIG. 3. FIG. 1 is an explosion drawing of a lens adjusting mechanism 10 according to an embodiment of the present invention. FIG. 2 is an assembly drawing of the lens adjusting mechanism 10 as shown in FIG. 1. FIG. 3 is an explosion drawing of a lens adjusting mechanism 10 according to another embodiment of the present invention. As shown in FIG. 1, the lens adjusting mechanism 10 includes a light-valve case 20, a light valve 28, a lens case 22, a plurality of fasteners 24, and a leaf spring assembly 26, wherein the lens case 22, the plurality of fasteners 24 and the leaf spring assembly 26 respectively correspond to a lens carrier 32, a plurality of combiners 34, and a thin elastic element 36 in FIG. 3.

The light valve 28 is assembled on the light-valve case 20 to emit image beam. The light-valve case 20 has a light emitting opening 2002 to allow the image beam emitted out from the light-valve case 20. The light-valve case 20 has a first opening edge 2004 adjacent to the light emitting opening 2002.

The lens case 22 or the lens carrier 32 is used to hold a lens module 27 having an optical axis (not shown in figures), wherein the lens module 27 includes one or more lens. The lens case 22 has a light-path entrance 2202 and a light-path exit 2204; and the lens carrier 32 has a first light-path through hole 3202 and a second light-path through hole 3204. The image beam sequentially passes through the light-path entrance 2202/the first light-path through hole 3202, the lens case 22/the lens carrier 32, and the light-path exit 2204/the second light-path through hole.

The lens case 22 further includes a second opening edge 2206 adjacent to the light-path entrance 2202. Wherein the light-valve case 20 as shown in FIG. 1 is assembled to the lens case 22 via the first opening edge 2004 and the second opening edge 2206. The plurality of fasteners 24 is to connect the first opening edge 2004 with the second opening edge 2206. The fasteners 24 can be fastened by thread locking, but the invention is not limited herein.

Four leaf contacts 2602 is disposed on four sides of the leaf spring assembly 26, and a plurality of holes are disposed closely adjacent to the leaf contacts 2602 for the fasteners 24 to pass through. The leaf spring assembly 26 is disposed between the first opening edge 2004 and the second opening edge 2206 to make the leaf contacts 2602 contact against the first opening edge 2004 or the second opening edge 2206. As shown in FIG. 1, the leaf contacts 2602 are adjacent to the corresponding locations of the fasteners 24 and elastically contact against the first opening edge 2004. As shown in FIG. 3, four elastic hooks 3602 are disposed on four sides of the thin elastic element 36, and a plurality of holes are disposed adjacent to the elastic hook 3602 for the combiners 34 to pass through. The elastic hooks 3602 are adjacent to the corresponding locations of the combiners 34 and elastically contact against a through-hole edge 3206. As shown in FIG. 3, the plurality of combiners 34 is to assemble the thin elastic element 36 and the through-hole edge 3206. The combiners 34 can be fastened by thread locking, but the invention is not limited herein.

Therefore, a distance between the first opening edge 2004 and the second opening edge 2206, or a distance between the thin elastic element 36 and the through-hole edge 3206, can be controlled by adjusting the fasteners 24 or the combiners 34 and so as to adjust the optical axis of lens module 27 (not shown in figures) to match image beam or parallel to an optical axis of the light valve (not shown in figures); and thus, desired display effect and optimal resolution can be acquired. According to an actual projected image, locking tightness of the fasteners 24 or the combiners 34 can be adjusted during manufacturing process to fix image distortion. The adjustment can also compensate manufacturing tolerances of parts and assembling tolerances during the assembling process to make the projected image on the screen has desired display condition.

Figure 4A:
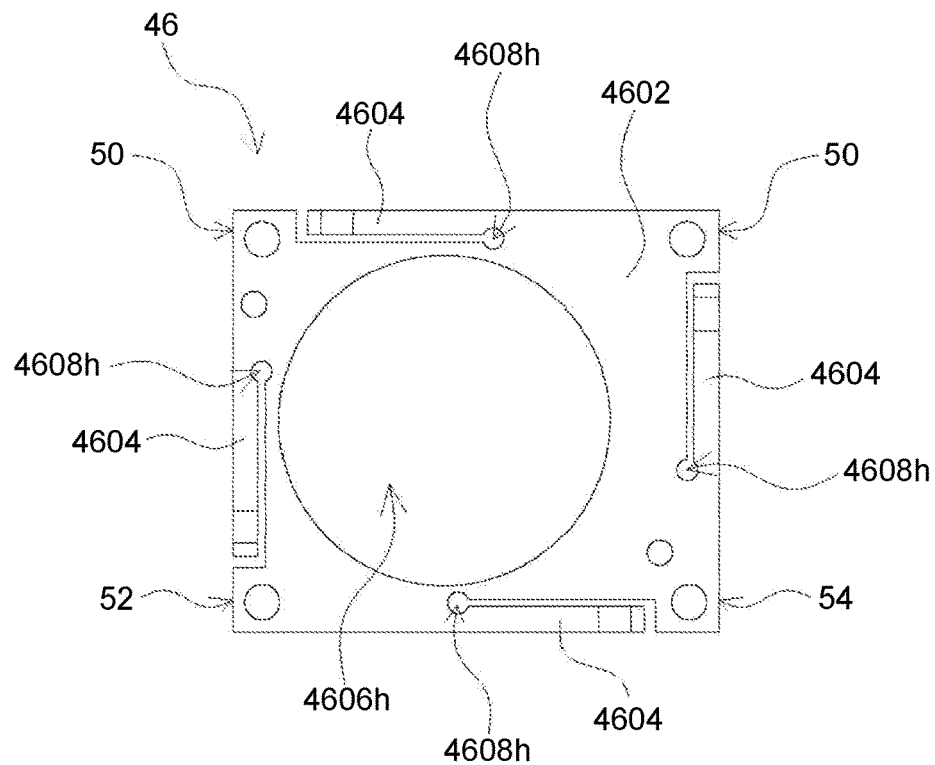
FIG. 4A is a schematic diagram of a plate spring according to an embodiment of the present invention.
Figure 4B:
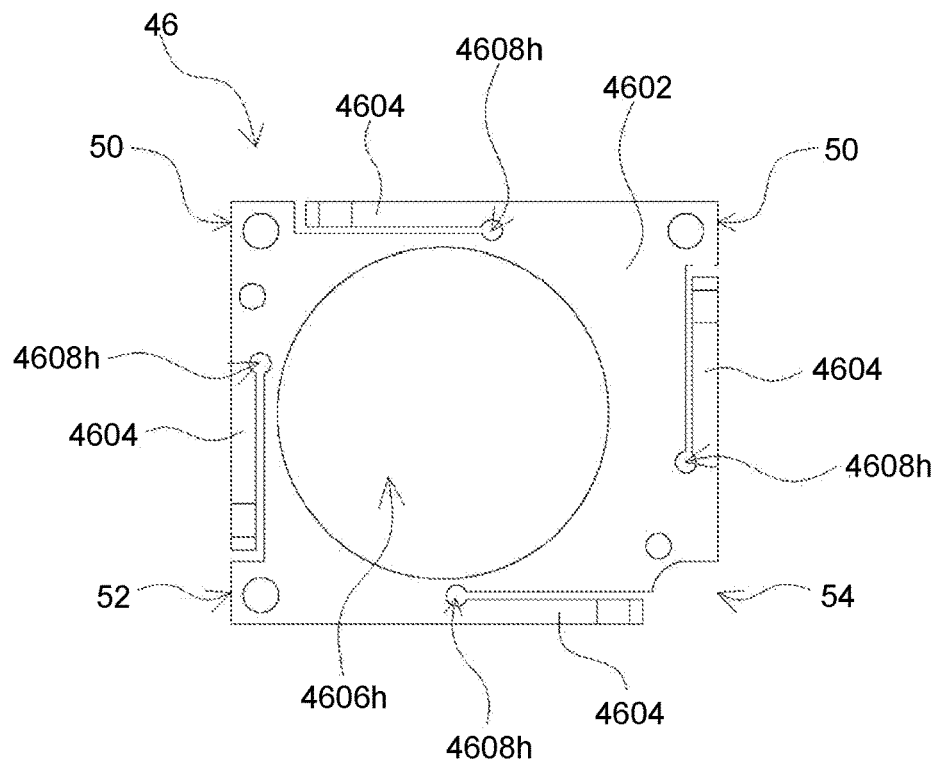
FIG. 4B is a schematic diagram of another plate spring according to an embodiment of the present invention.
Figure 4C:
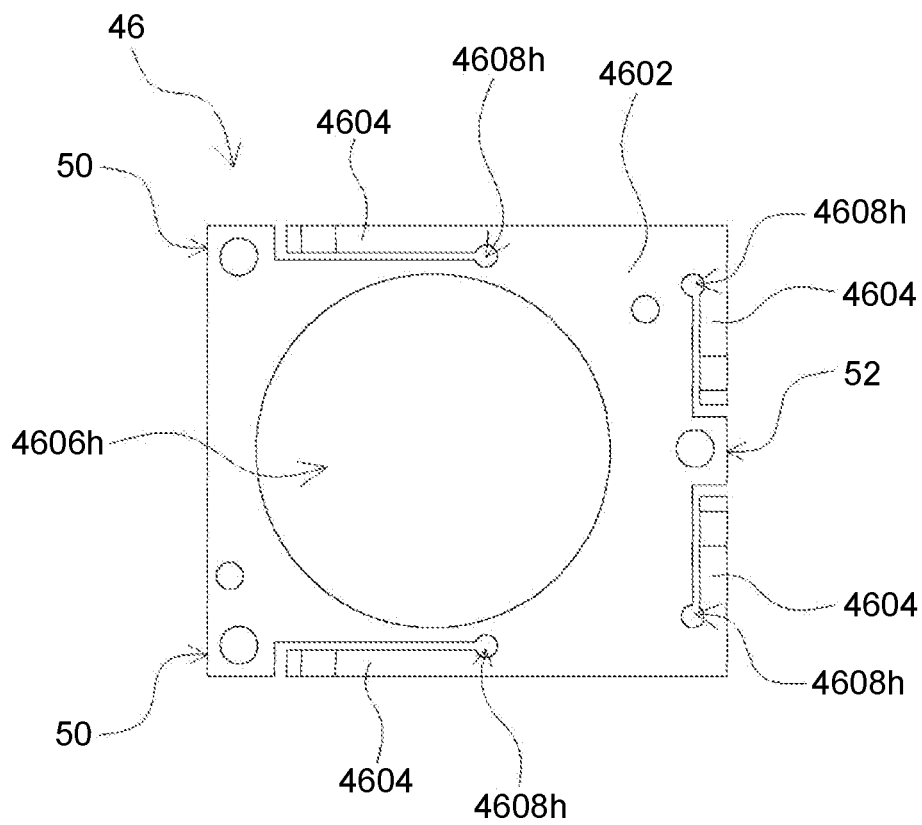
FIG. 4C is a schematic diagram of another plate spring according to an embodiment of the present invention.

The leaf spring assembly 26 as shown in FIG. 1 and the thin elastic element 36 as shown in FIG. 3 can be replaced by different plate springs 46 as shown in FIGS. 4A-4C. As shown in FIG. 4A, FIG. 4B, and FIG. 4C, the plate spring 46 includes a substrate 4602 and a plurality of contact parts 4604. The substrate 4602 has a through hole 4606h, and the contact parts 4604 extend from the substrate 4602 and dispersedly and circularly adjacent to the through hole 4606h. When the lens adjusting mechanism 10 is assembled, the through hole 4606h is corresponding to (or completely overlapped with) a first opening. Moreover, the plate spring 46 further includes stress dispersion holes 4608h, which every of the stress dispersion holes 4608h is disposed adjacent to a location of one of the contact part 4604 connecting with the substrate 4602 in order to disperse stress to avoid breakage of the contact part 4604 on the connecting area with the substrate 4602 by long-term deformation.

FIG. 4A shows the plate spring 46 according to an embodiment of the present invention for illustration. The plate spring 46 includes four contact parts 4604. Four fasteners (not shown in the figure) are located corresponding to four locations of the plate spring 46, wherein the four locations have through holes formed thereon for the fasteners to pass through; and it is suggested to make one of the four fasteners being as a fixed point 54. The fixed point 54 is which the one fastener is fixed at the beginning of assembling process without further adjustment thereafter. And a location of one of the rest three fasteners, which is adjacent to (or close to) the fixed point 54, is as an auxiliary point 52. The auxiliary point 52 is adjusted to certain tightness at first, and is further adjusted only when adjusting points 50 are unable to achieve desired effects. As in the FIG. 4A, the other two adjacent locations of the four fasteners are defined as adjusting points 50. Generally, the optical axis (not shown) can be adjusted by the two fasteners at the adjusting points 50 to make the optical axis matching with image beam or parallel to the optical axis of light valve (not shown) in order to acquire desired displaying effects and optimal resolution.

FIG. 4B shows the plate spring 46 according to another embodiment of the present invention for illustration. The plate spring 46 includes four contact parts 4604. Four fasteners are located corresponding to four locations of the plate spring 46. The only difference from FIG. 4A is that one of the locations does not have a through hole formed thereon but a gap, and one of the four fasteners is fixed on the location where the gap is. The location with the gap is as the fixed point 54 to fix, but not to adjust, the plate spring 46 in-between the first opening edge 2004 and the second opening edge 2206. The other three locations can be all adjusting points 50; or one of them can be an auxiliary point 52 and the other two adjacent to each other can be adjusting points 50.

FIG. 4C shows the plate spring 46 according to another embodiment of the present invention for illustration. There are only three fasteners corresponding to three locations of the plate spring 46. The plate spring 46 includes at least three contact parts 4604, and optical axis can be adjusted by two adjacent fasteners of the three.

As shown in FIG. 4C, the plate spring 46 have four contact parts 4604. The plate spring 46 is correspondingly a rectangle, and two of the three fasteners are positioned corresponding to two adjacent corners of the plate spring 46, and the other fastener is positioned corresponding to a middle region of the substrate 4602 away from the two adjacent corners of the plate spring 46. And there are two contact parts 4604 disposed on the plate spring 46 symmetrically with respect to the fastener at the middle region of the substrate 4602.

In the embodiment, the location of the fastener at the middle region can be the auxiliary point 52, and the other two locations of the fasteners at the two corners of the substrate 4602 can be adjusting points 50 for quick adjustment for desired optical axis.

The above embodiments further have following characteristics. The substrate 4602 and the contact parts 4604 can be a one-piece structure, or/and the contact parts 4604 can be fixed on the substrate 4602 by thread locking or other conventional method; and moreover, the plurality of fasteners of the lens adjusting mechanism 10 has the same locking direction from the same side of the plate spring 46 to the other side in order to assemble a first edge and the second edge. The fastener can be a screw, a bolt or a clip; and material of the plate spring 46 can be stainless steel with a material number of SUS301 and a length of one of the contact parts 4604 is better longer than 8 centimeter (cm).

Figure 5A:
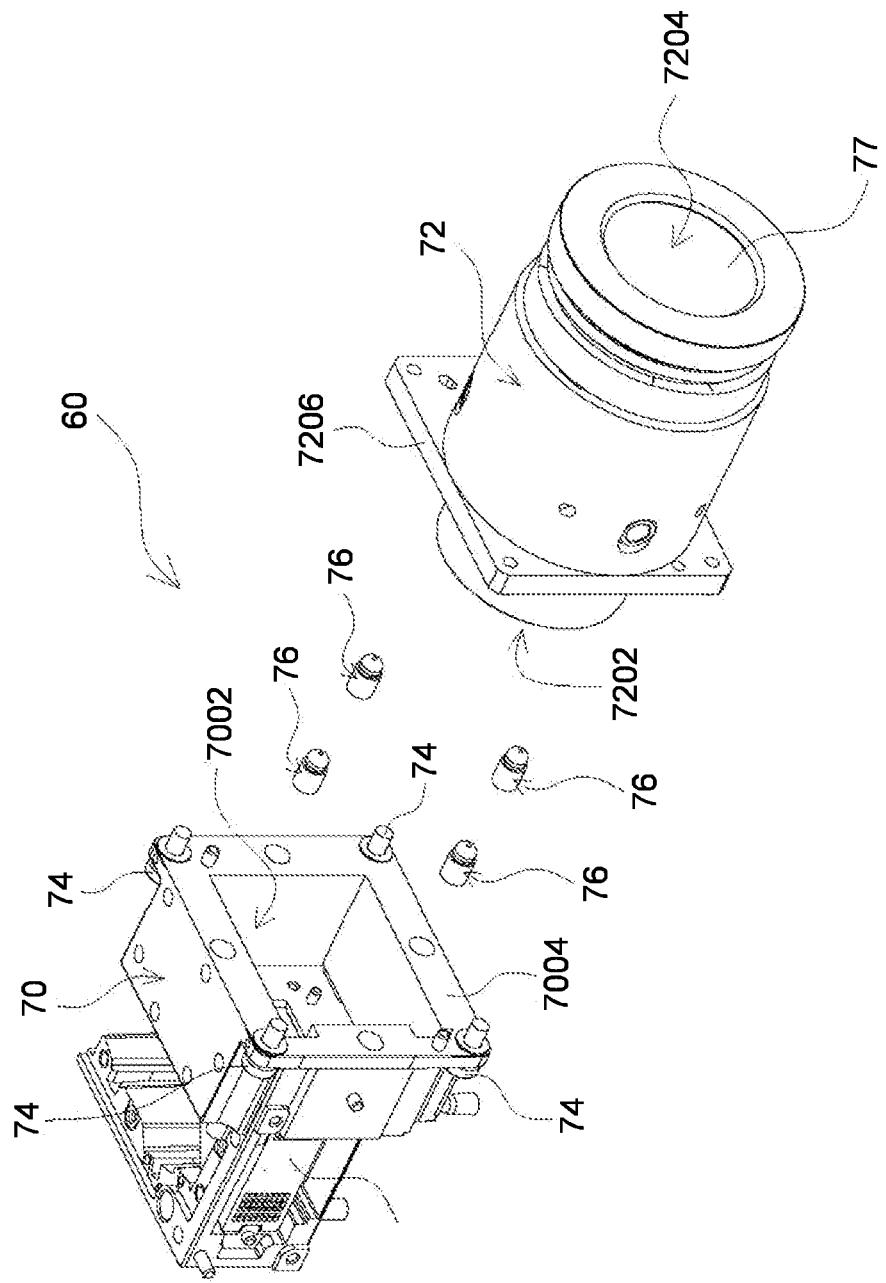
FIG. 5A is an explosion drawing of a projecting lens adjusting mechanism according to an embodiment of the present invention.
Figure 5B:
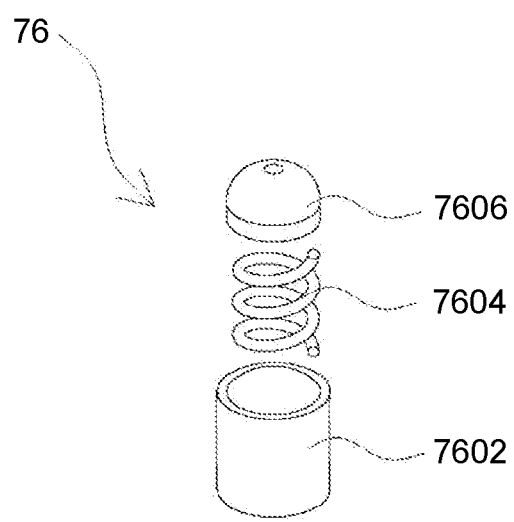
FIG. 5B is an explosion diagram of the elastic element as shown in FIG. 5A.

Please refer to FIGS. 5A and 5B. FIG. 5A is an explosion diagram of a projecting lens adjusting mechanism 60 according to an embodiment of the present invention. FIG. 5B is an explosion diagram of an elastic element 76 as shown in FIG. 5A. The projecting lens adjusting mechanism 60 includes a light-valve case 70, a projecting lens case 72, at least one fastener 74 and at least one elastic element 76, wherein the light-valve case 70, the projecting lens case 72 and the fastener 74 respectively correspond to the light-valve case 20, the lens case 22 and the fastener 24 as shown in FIG. 1.

A light valve 78, a light emitting opening 7002, the first edge 7004, the second edge 7206, a lens module 77, a first opening 7202, and a second opening 7204 respectively correspond to the light valve 28, the light emitting opening 2002, the first opening edge 2004, the second opening edge 2206, the lens module 27, the light-path entrance 2202 and the light-path exit 2204 as shown in FIG. 1; and details are not described in the following illustration for the sake of brevity. As shown in FIG. 5B, the elastic element 76 includes a spring abutment 7602, a spring 7604, and a spring head 7606; wherein one end of the spring 7604 contacts against the spring abutment 7602, and the other end of the spring 7604 contacts against the spring head 7606. The spring abutment 7602 is fixed on one of the first edge 7004 and the second edge 7206. The spring head 7606 contacts against the other of the first peripheral region 7004 and the second peripheral region 7206. The figure shows an example that grooves are disposed respectively on the four sides of the first edge 7004 to immobilize the spring abutments 7602, and the spring head 7606 contacts against the second edge 7206.

Wherein, a distance between the first edge 7004 and the second edge 7206 can be controlled by adjusting a degree of locking tightness of the fasteners 74 so as to adjust the optical axis (not shown in figures) in order to match with image beam or be parallel to the optical axis of the light valve (not shown in figures); and thus, desired display effect and optimal resolution can be acquired.

In addition, every spring abutment 7602 of every of the plurality of the elastic elements 76 can have the same direction toward the spring head 7606. The fastener 74 can be a screw, a bolt or a clip.

Therefore, the embodiment of the present invention provides a lens adjusting mechanism 10, which can compensate manufacturing tolerances of parts and assembling tolerances during the assembling process and make the image beam matched with the optical axis or being parallel to the optical axis of light valve by the design of the leaf spring assembly 26, the thin elastic element 36, the plate spring 46 or the elastic element 76. And thus, quality of an image on the screen can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lens adjusting mechanism, comprising:
    a light-valve case, having a light emitting opening and a first opening edge adjacent to the light emitting opening;
    a lens case, having a light-path entrance, a light-path exit and a second opening edge adjacent to the light-path entrance;
    at least one fastener to connect the first opening edge and the second opening edge; and
    a spring assembly, having at least one elastic plate contact contacting against the first opening edge and the second opening edge, the at least one elastic plate contact capable of exerting a pushing force on the first opening edge or the second opening edge,
    wherein the fastener is capable of adjusting a distance between the first opening edge and the second opening edge.

2. The lens adjusting mechanism according to claim 1, wherein the spring assembly is a plate spring.

3. The lens adjusting mechanism according to claim 2, wherein the plate spring further comprises a substrate, the at least one elastic plate contact comprises a plurality of elastic plate contacts, the substrate has a through hole, and the elastic plate contacts are disposed adjacent to the through hole.

4. The lens adjusting mechanism according to claim 3, wherein the plate spring comprises a stress dispersion hole disposed adjacent to a location of one of the elastic plate contacts connecting with the substrate.

5. The lens adjusting mechanism according to claim 3, wherein two adjacent fasteners are capable of adjusting the distance.

6. The lens adjusting mechanism according to claim 3, wherein one of the at least one fastener is capable of fixing rather than adjusting the distance.

7. The lens adjusting mechanism according to claim 6, wherein the substrate includes a gap, and the gap is corresponding to the one of the at least one fastener.

8. The lens adjusting mechanism according to claim 3, wherein the at least one fastener includes three fasteners disposed corresponding to three of the elastic plate contacts of the plate spring.

9. The lens adjusting mechanism according to claim 3, wherein the number of the elastic plate contacts is four, the at least one fastener includes three fasteners, two of the three fasteners are positioned corresponding to two adjacent corners of the plate spring, the other fastener is positioned corresponding to a middle region of the substrate away from the two adjacent corners of the plate spring, and two of the elastic plate contacts are disposed symmetrically with respect to the fastener at the middle region of the substrate on the plate spring.

10. The lens adjusting mechanism according to claim 3, wherein the lens adjusting mechanism satisfies one of the following: (1) the substrate and the elastic plate contacts are a one-piece structure; (2) the elastic plate contacts are fixed on the substrate by thread locking; (3) the at least one fastener has only one assembling direction from one side of the plate spring to an opposite side of the plate spring; (4) the fastener is a screw, a bolt or a clip; (5) material of the plate spring is SUS301 stainless steel; and (6) a length of one of the elastic plate contacts is longer than 8 centimeter.

11. A lens adjusting mechanism, comprising:
    a lens carrier, having a first light-path through hole, a second light-path through hole, and a through-hole edge adjacent to the first light-path through hole;
    a thin elastic element, having at least one elastic hook attached to the through-hole edge; and
    at least one combiner for combining the through-hole edge and the thin elastic element,
    wherein the combiner is capable of adjusting a distance between the thin elastic element and the through-hole edge.

12. The lens adjusting mechanism according to claim 11, wherein the combiner is a fastener, and the thin elastic element is a plate spring.

13. The lens adjusting mechanism according to claim 12, wherein the plate spring comprises a substrate and a plurality of contact parts, the substrate has a through hole, and the contact parts are disposed adjacent to the through hole.

14. The lens adjusting mechanism according to claim 12, wherein the plate spring comprises a stress dispersion hole disposed adjacent to a location of one of the contact parts connecting with the substrate.

15. The lens adjusting mechanism according to claim 12, wherein the distance is adjusted by two adjacent fasteners.

16. The lens adjusting mechanism according to claim 12, wherein one of the at least one fastener is to fix but not to adjust the distance.

17. The lens adjusting mechanism according to claim 12, wherein the at least one fastener includes three fasteners disposed corresponding to three contact parts of the plate spring.

18. The lens adjusting mechanism according to claim 12, wherein the plate spring comprises four contact parts, the at least one fastener includes three fasteners, two of the three fasteners are positioned corresponding to two adjacent corners of the plate spring, the other fastener is positioned corresponding to a middle region of the substrate away from the two adjacent corners of the plate spring, and two of the contact parts are disposed symmetrically with respect to the fastener at the middle region of the substrate on the plate spring.

19. The lens adjusting mechanism according to claim 12, wherein the lens adjusting mechanism satisfies one of the following: (1) the substrate and the contact parts are a one-piece structure; (2) the contact parts is fixed on the substrate by thread locking; (3) the at least one fastener has only one assembling direction from one side of the plate spring to an opposite side of the plate spring; (4) the fastener is a screw, a bolt or a clip; (5) material of the plate spring is SUS301 stainless steel; and (6) a length of one of the contact parts is longer than 8 centimeter.

20. A lens adjusting mechanism, comprising:
a light-valve case, having a light emitting opening and a first edge adjacent to the light emitting opening;
a projecting lens case, having a first opening, a second opening, and a second edge adjacent to the first opening;
at least one fastener to connect the first edge and the second edge; and
an elastic element, comprising a spring abutment, a spring, and a spring head, an end of the spring contacts against the spring abutment, the other end of the spring contacts against the spring head, the spring abutment is fixed on one of the first edge and the second edge, and the spring head contacts against the other of the first edge and the second edge,
wherein the fastener is to adjust a distance between the first edge and the second edge, the lens adjusting mechanism further comprises a light-valve and a lens module, the light valve is disposed on the light-valve case, the projecting lens case is to hold the lens module, the spring abutment of every of the at least one elastic element has the same direction toward the spring head, and the fastener is a screw, a bolt or a clip.

* * * * *